United States Patent [19]
Ajiro

[11] Patent Number: 5,915,125
[45] Date of Patent: Jun. 22, 1999

[54] DEVICE DRIVER, CONTROL METHOD FOR DEVICE DRIVERS, AND COMPUTER-READABLE MEDIUM FOR STORING CONTROL PROGRAM FOR DEVICE DRIVERS

[75] Inventor: Ken Ajiro, Tokyo, Japan

[73] Assignee: NEC Corporation, Tokyo, Japan

[21] Appl. No.: 08/924,960

[22] Filed: Sep. 9, 1997

[30] Foreign Application Priority Data

Sep. 13, 1996 [JP] Japan ...................................... 8-243169

[51] Int. Cl.$^6$ ....................................................... G06F 13/00
[52] U.S. Cl. ........................... 395/830; 395/884; 395/892
[58] Field of Search .................................. 395/828–834, 395/822–825, 892, 701, 704, 712

[56] References Cited

U.S. PATENT DOCUMENTS

| | | | |
|---|---|---|---|
| 5,659,788 | 8/1997 | Someya et al. .......................... | 395/500 |
| 5,768,568 | 6/1998 | Inui et al. ................................ | 395/828 |
| 5,781,794 | 7/1998 | Okazaki .................................. | 395/822 |
| 5,781,798 | 7/1998 | Beatty et al. ........................... | 395/830 |

FOREIGN PATENT DOCUMENTS 4-58351  2/1992  Japan .

*Primary Examiner*—Christopher B. Shin
*Attorney, Agent, or Firm*—Whitham, Curtis & Whitham

[57] ABSTRACT

In a computer system to which hardware units differing in control method are connected and which controls operations with a plurality of plug sections each appropriate to one or another of the different control methods, a control information memory stores a table for each type of hardware memorizing information as to which plug section should control the operation of that type. As an operating instruction is given specifying the hardware unit to be controlled, the control information memory determines the plug section with which to transfer the operating instruction with reference to this table, and transfers the operating instruction to this plug section.

13 Claims, 6 Drawing Sheets

FIG.2

| HARDWARE TO BE CONTROLLED / OPERATION | HARDWARE 1 | HARDWARE 2 | ...... |
|---|---|---|---|
| OPERATION A | PLUG SECTION FOR HARDWARE 1; CONTROL A | PLUG SECTION FOR HARDWARE 2; CONTROL A | |
| OPERATION B | PLUG SECTION FOR HARDWARE 1; CONTROL B | PLUG SECTION FOR HARDWARE 2; CONTROL B | |
| OPERATION C | PLUG SECTION FOR HARDWARE 1; CONTROL C | PLUG SECTION FOR HARDWARE 2; CONTROL C | |
| ...... | | | |

| OPERATION \ HARDWARE TO BE CONTROLLED | FLOPPY DISK | FLOPTICAL DISK |
|---|---|---|
| WRITE | WRITE INTO FLOPPY DISK | WRITE INTO FLOPTICAL DISK |
| READ | READ OUT OF FLOPPY DISK | READ OUT OF FLOPTICAL DISK |
| SEEK | SEEK ON FLOPPY DISK | SEEK ON FLOPTICAL DISK |
| EJECT MEDIUM | EJECT FLOPPY DISK MEDIUM | EJECT FLOPTICAL DISK MEDIUM |
| FORMAT | FORMAT FLOPPY DISK | FORMAT FLOPTICAL DISK |
| SET RECORDING DENSITY | SET RECORDING DENSITY ON FLOPPY DISK | SET RECORDING DENSITY ON FLOPTICAL DISK |
| RESET | RESET FLOPPY DISK | RESET FLOPTICAL DISK |

DEVICE DRIVER, CONTROL METHOD FOR DEVICE DRIVERS, AND COMPUTER-READABLE MEDIUM FOR STORING CONTROL PROGRAM FOR DEVICE DRIVERS

BACKGROUND OF THE INVENTION

1. Field of the Invention

The present invention relates to a device driver for controlling a plurality of hardware units connected to a computer system and controlled by different methods, a control method for device drivers and a computer-readable medium for storing a control program for device drivers.

2. Description of the Related Art

A conventional device driver controls a plurality of hardware units connected to it either in accordance with programs each intended for one or another of these units, or in such a manner that, as disclosed in the Japanese Patent Application Laid-open No. 4-58351, the segment which does not depend on the type of hardware is made independent as standard processing and processing intrinsic to each unit of hardware is performed in accordance with a program incorporated as a built-in subroutine.

Therefore, a problem associated with the first cited prior art method is that, where a plurality of peripheral units controllable by different methods are to be connected to a single computer system, as many device drivers as the control methods are required. A problem associated with second cited method is that, every time the device driver needs to support a new type of hardware, a subroutine for that particular hardware unit should be added, resulting in an expansion of the device driver and a consequent increase in the memory capacity it occupies.

SUMMARY OF THE INVENTION

One object of the present invention is to provide a device driver which, when a plurality of hardware units having different control methods are to be connected to one computer system, including device drivers which number fewer than the number of these control methods, a control method for controlling such device drivers, and a computer-readable medium for storing a control program for controlling these device drivers.

Another object of the invention is to provide a device driver which, when a hardware unit having a different control method is to be newly connected to a computer system, does not require the development of any new device driver, a control method for controlling such device drivers, and a computer-readable medium for controlling storing a control program for such device drivers.

According to a first aspect of the present invention, there is provided a device driver for controlling the operations of a plurality of hardware units which are connected to a computer system and which have differing control methods, comprising:

a plurality of plug sections, numbering as many as the number of control methods for said plurality of hardware units, said plurality of hardware control methods, each controlling the operation of a corresponding hardware unit by a method appropriate thereto, and a controller for determining, on the basis of information contained in an operating instruction for one of said plurality of hardware units to specify that hardware unit, the particular one of said plug sections to which the operating instruction is to be transferred, and transferring that operating instruction to that plug section.

According to a second aspect of the present invention, there is provided a device driver for controlling the operations of a plurality of hardware units connected to a computer system and having a common understandable data form for operating instructions but differing in control method, comprising:

a plurality of plug sections, provided as many as control methods for said plurality of hardware units, each controlling the operation of the corresponding hardware unit by a method appropriate thereto, a common processing means for converting the data form for operating instructions for one of said plurality of hardware units into another form understandable by that hardware unit, and a controller for determining, on the basis of information contained in the operating instruction whose data form has been converted by said common processing means to specify that hardware unit, the particular one of said plug sections to which the operating instruction is to be transferred, and transferring that operating instruction to that plug section.

According to a first aspect of the present invention, there is provided a device driver control method for controlling the operations of a plurality of hardware units connected to a computer system and differing in control method, comprising:

a step to determine, on the basis of information, contained in an operating instruction for one of said plurality of hardware units to specify that hardware unit, the particular one of a plurality of plug sections, provided as many as control methods for said plurality of hardware units, each controlling the operation of the corresponding hardware unit by a method appropriate thereto, to which the operating instruction is to be transferred, and to transfer that operating instruction to that plug section.

According to a second aspect of the present invention, there is provided a device driver control method for controlling the operations of a plurality of hardware units connected to a computer system and having a common understandable data form for operating instructions but differing in control method, comprising:

a step to convert the data form for operating instructions for one of said plurality of hardware units into another form understandable by that hardware unit, and a step to determine, on the basis of information, contained in the operating instruction whose data form has undergone said conversion to specify that hardware unit, the particular one of said plug sections, provided as many as control methods for said plurality of hardware units, each controlling the operation of the corresponding hardware unit by a method appropriate thereto, to which the operating instruction is to be transferred, and to transfer that operating instruction to that plug section.

According to a first aspect of the present invention, there is provided a computer-readable medium comprising:

a computer-readable data storage device; and a control program, provided on said device, for a device driver in a computer system to which a plurality of hardware units differing in control method are connected, said program comprising:

a program portion causing a computer to determine on the basis of information contained in an operating instruction for one of said plurality of hardware units to specify that hardware unit, the particular one of a plurality of plug sections, provided as many as control methods for said plurality of hardware units, each controlling the operation of the corresponding hardware unit by a method appropriate thereto, to which the operating instruction is to be transferred, and to transfer that operating instruction to that plug section.

According to a second aspect of the present invention, there is provided a computer-readable medium comprising:

a computer-readable data storage device, and a control program, provided on said device, for a device driver in a computer system to which a plurality of hardware units having a common understandable data form for operating instructions but differing in control method are connected, said program comprising:

a first program portion causing a computer to convert the data form for operating instructions for one of said plurality of hardware units into another form understandable by that hardware unit, and a second program portion causing the computer to determine, on the basis of information contained in the operating instruction whose data form has undergone said conversion to specify that hardware unit, the particular one of said plug sections, provided as many as control methods for said plurality of hardware units, each controlling the operation of the corresponding hardware unit by a method appropriate thereto, to which the operating instruction is to be transferred, and to transfer that operating instruction to that plug section.

BRIEF DESCRIPTION OF THE DRAWINGS

Other features and advantages of the present invention will become more apparent from the detailed description hereunder when taken in conjunction with the accompanying drawings, wherein:

FIG. 2 illustrates the contents of a control information memory (50) in the preferred embodiment of the invention;

FIG. 5 illustrates the contents of the control information memory (50) in the example shown in FIG. 4.

DETAILED DESCRIPTION OF THE PREFERRED EMBODIMENTS

Next will be described in detail preferred embodiments of the invention with reference to drawings.

Figure 1:
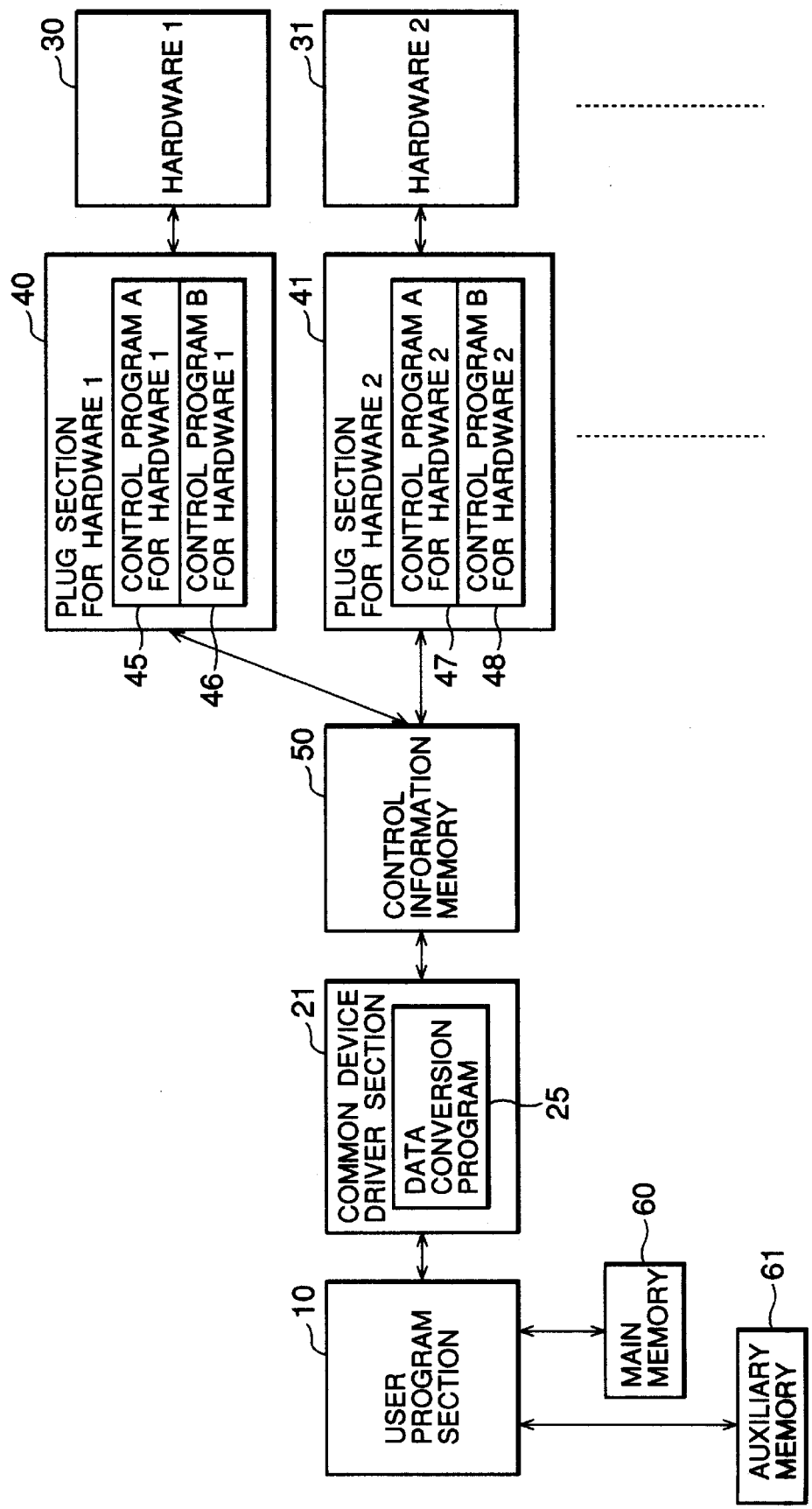
FIG. 1 is a block diagram illustrating the configuration of a preferred embodiment of the invention.

FIG. 1 is intended to facilitate explanation of the principle of the invention. In FIG. 1, reference numeral 10 denotes a user program section operating as an operating system (OS) for the basic operation of the host computer per se or as an application program (AP) for its applied operation, and 21, a common device driver section serving as common driver for every hardware unit. Reference numeral 50 represents a control information memory for selecting a plug section corresponding to an instruction on an input/output action from the host computer. Reference numerals 40 and 41 are plug sections for hardware which are directly connected to hardware units and which cause the respective hardware units to perform instructed actions, and 30 and 31 peripheral hardware units, each of which may be a floppy disk, a hard disk, an inkjet or laser printer, a modem, a digital camera, a scanner, or a display unit among other things. Reference numeral 60 refers to a main memory indispensable for the operation of the host computer, such as a DRAM, an SRAM or a flash memory and 61 correspond to, a large-capacity auxiliary memory provided for the host computer, which may be, for instance, a magnetic tape apparatus, a CD-ROM, a CD-R, a DVD or a photomagnetic disk.

In the control information memory (50) is stored, for example, a table such as shown in FIG. 2. This table memorizes, with respect to each type of hardware, which of the plug sections (40 and 41) are to be used for hardware control in performing requested actions A, B, C and so on.

When the user program section (10) requests the peripheral hardware unit 1 (30) or hardware unit 2 (31) for an input/output, the common device driver section (21) is called irrespective of whether the hardware unit 1 (30) or the hardware unit 2 (31) is called.

Whereas common processing independent of the type of hardware (30 or 31) is performed by the common device driver section (21), the common device driver section (21) of this preferred embodiment is provided with a data conversion program (25), which converts data received from the user program section (10) into a data form for use by the hardware (30 or 31), and divides the data into units usable by the hardware (30 or 31). The data conversion program (25) also converts the output data read out of the hardware (30 or 31) into a data form usable by the user program section (10) and, at the same time, combines data units.

After that, the control information memory (50) determines which of the plug sections (40 and 41) contains a hardware control program (e.g. 45) for controlling the called hardware unit (e.g. 30), loads the determined plug section (e.g. 40) onto the main memory (60), and calls the hardware control program (e.g. 45) for performing the control requested by the user program section (10). Thus, the control information memory (50) transfers, together with data, a signal to instruct the plug section (e.g. 40) corresponding to the type or reference number of hardware instructed by the user program section (10) to perform the required operation.

Meanwhile, hardware control programs (45 through 48) perform inputting/outputting to and from hardware units (30 and 31). Upon completion of the inputting/outputting, the plug sections (40 and 41) notify the common device driver section (21) of the completion, and deliver data from the hardware units (30 and 31) to it.

The common device driver section (21) converts with its internal data conversion program (25) the data delivered from the plug sections (40 and 41) into a form usable by the user program section (10), and delivers the converted data to the user program section (10).

Incidentally, each plug section (40 or 41) is loaded onto the main memory (60) of the host computer from the auxiliary memory (61) when it is used for the first time, performs inputting/outputting to and from the hardware (30 or 31) and, after completion of a series of processings, the plug section (40 or 41) for the hardware unit whose use has been completed is deleted from the main memory (60).

Figure 3:
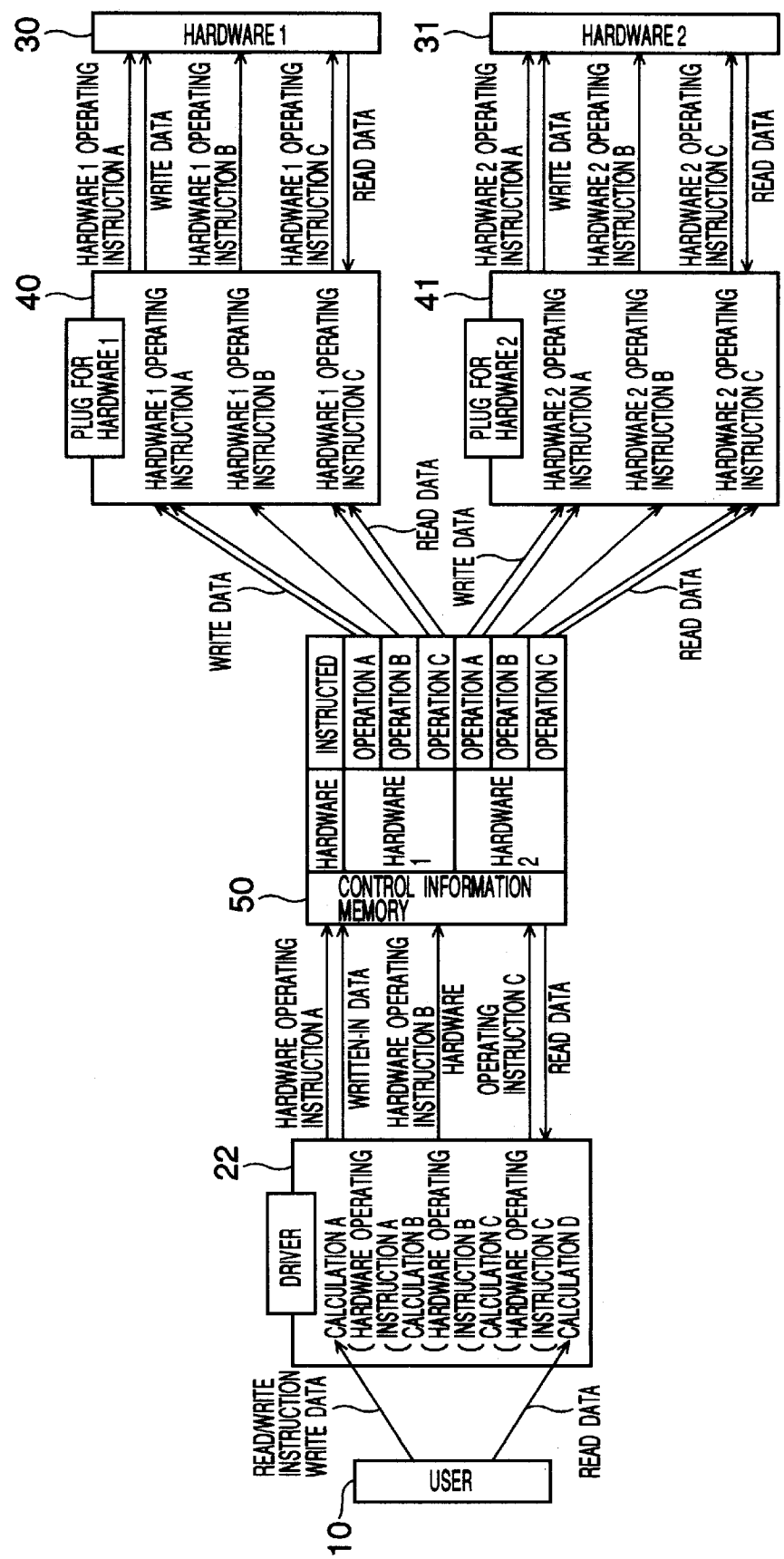
FIG. 3 is a block diagram illustrating the configuration of the preferred embodiment of the invention in more detail.

The operation of this preferred embodiment of the invention will be described in further detail below with reference to FIG. 3.

First, when the hardware unit 1 (30) is selected as hardware to be given an operating instruction, the user program (10) transfers this selection result, a read/write instruction and write data to a common driver (22). When given an operating instruction, the common driver (22) performs a logical calculation (Calculation A) for converting the data form, logical form and data split/adjustment to enable the hardware unit 1 (30) to operate, and then transfers information to instruct the hardware 1 (30) to perform Operation A (Hardware Operating Instruction A) to the control information memory (50). The control information memory (50), perceiving from the transferred Hardware Operating Instruction A that the hardware unit to operate is the hardware 1 (30) and that the operating instruction should be transferred to the plug section (40) for the hardware 1, transfers Write Instruction A and the write data to the plug section (40) for the hardware 1. The plug section (40) for the hardware 1 conveys this Write Instruction A to the hardware 1 (30) and stores the write data into the hardware 1 (30).

Next the common driver (22), after performing another logical calculation (Calculation B), transfers to the control information memory (50) information to instruct the hardware unit 1 (30) to perform Operation B (Hardware Operating Instruction B). The control information memory (50), perceiving from the transferred Hardware Operating Instruction B that the hardware unit to operate is the hardware 1 (30) and that the operating instruction should be transferred to the plug section (40) for the hardware 1, transfers as Operating Instruction B for the hardware 1 an instruction to perform such an operation as pause or reset to the plug section (40) for the hardware 1. The plug section (40) for the hardware 1 performs the instructed operation on the hardware 1 (30).

Furthermore the common driver (22), after performing still another logical calculation (Calculation C), transfers to the control information memory (50) information to instruct the hardware unit 1 (30) to perform Operation C (Hardware Operating Instruction C). The control information memory (50), perceiving from the transferred Hardware Operating Instruction C that the hardware unit to operate is the hardware 1 (30) and that the operating instruction should be transferred to the plug section (40) for the hardware 1, transfers the instruction to perform Operation C to the plug section (40) for the hardware 1. The plug section (40) for the hardware 1 reads data out of the hardware 1 (30) as Operating Instruction C for the hardware 1. The read data are transferred via the plug section (40) and the control information memory (50) to the common driver (22) and, after their data form is converted by the common driver (22) as Logical Calculation D into a data form, a control machine language and the like which can be interpreted by the user program section (10), transferred to the user program section (10). Incidentally when the data are written or read, if the hardware units (30 and 31) are floppy disks, control data to indicate the write area and the read area, together with other read/write instructions and write data, are also transferred from the user program section (10) to the common driver (22) so that a seek operation can also be performed.

When the plug section (41) is to be operated, information to specify the hardware 2 (31) into which data are to be written is transferred together with a read/write instruction and write data, and then the common driver (22) converts the data in the same way as when the hardware 1 (30) is given a similar instruction. The control information memory 50 determines the plug section (41) indicated by the user program section (10), and transfers instructions to perform Operations A through C to the plug section (41).

Figure 4:
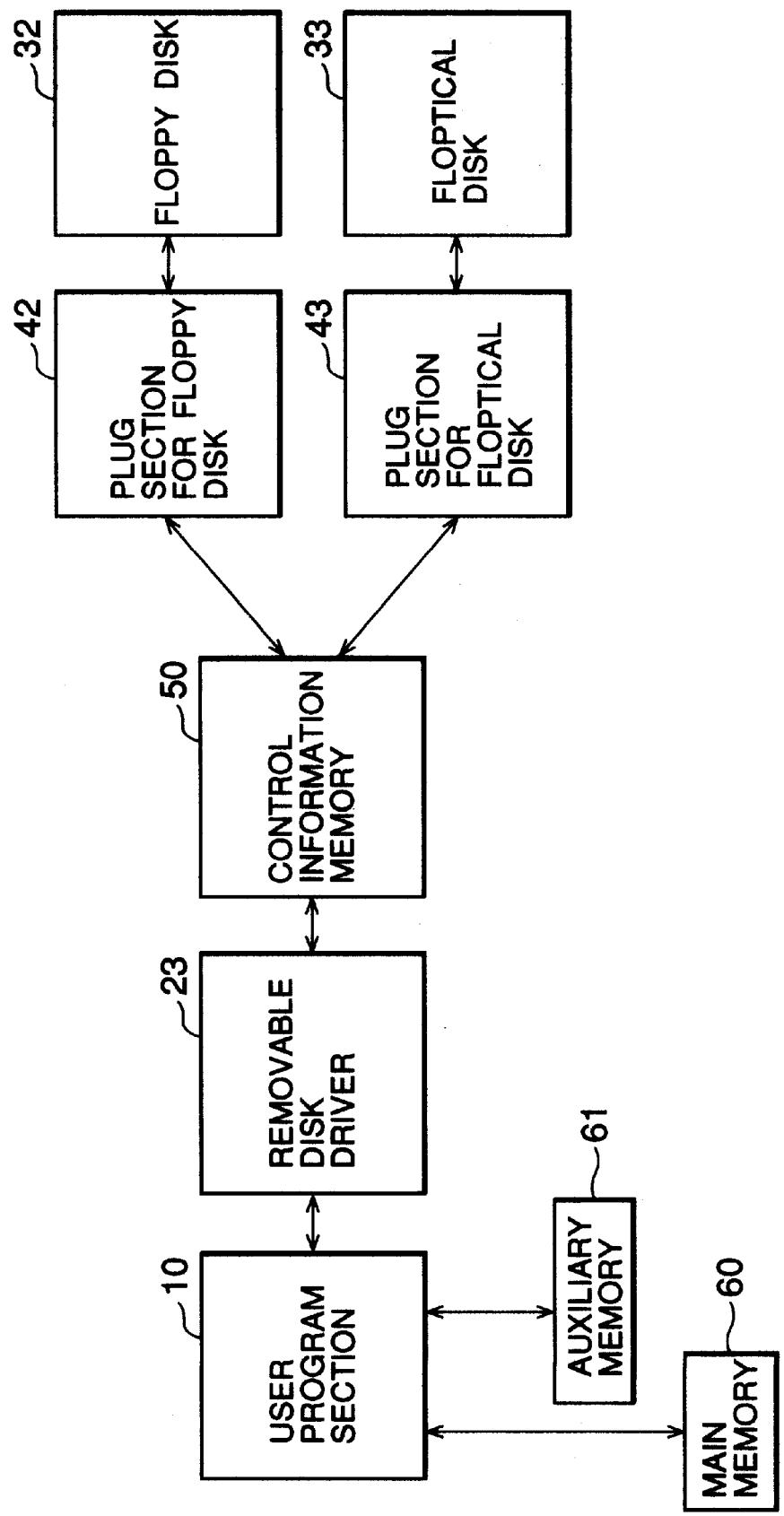
FIG. 4 is a block diagram illustrating the configuration of the preferred embodiment of the invention with reference to a more specific example.

Next will be described the operation of this preferred embodiment with reference to a specific example. Referring to FIG. 4, the hardware units which are connected are a floppy disk apparatus (32), which accommodates a removable magnetic disk medium, and a floptical disk apparatus (such as an MO) (33).

FIG. 5 illustrates the specific contents of the control information memory (50) in this example. In the control information memory means (50) is entered, for each type of hardware to be controlled, a table memorizing which plug section (42 or 43) is to be given an operating instruction in response to an operating instruction given by the host computer. The types of operations include writing, reading, seeking, ejecting the disk medium, formatting the medium, recording density setting at, e.g. 1.2 M or 1.4 M, done before formatting the medium, and resetting the disk. Writing or reading may include an action to seek a track and a sector on the disk. The choice of the floppy disk apparatus (32) of the floptical disk apparatus (33) is recorded in the main memory (60), and various operations are instructed after specifying whether an given operating instruction from the user program section (10) is directed to the floppy disk apparatus (32) or to the floptical disk apparatus (33).

Figure 6:
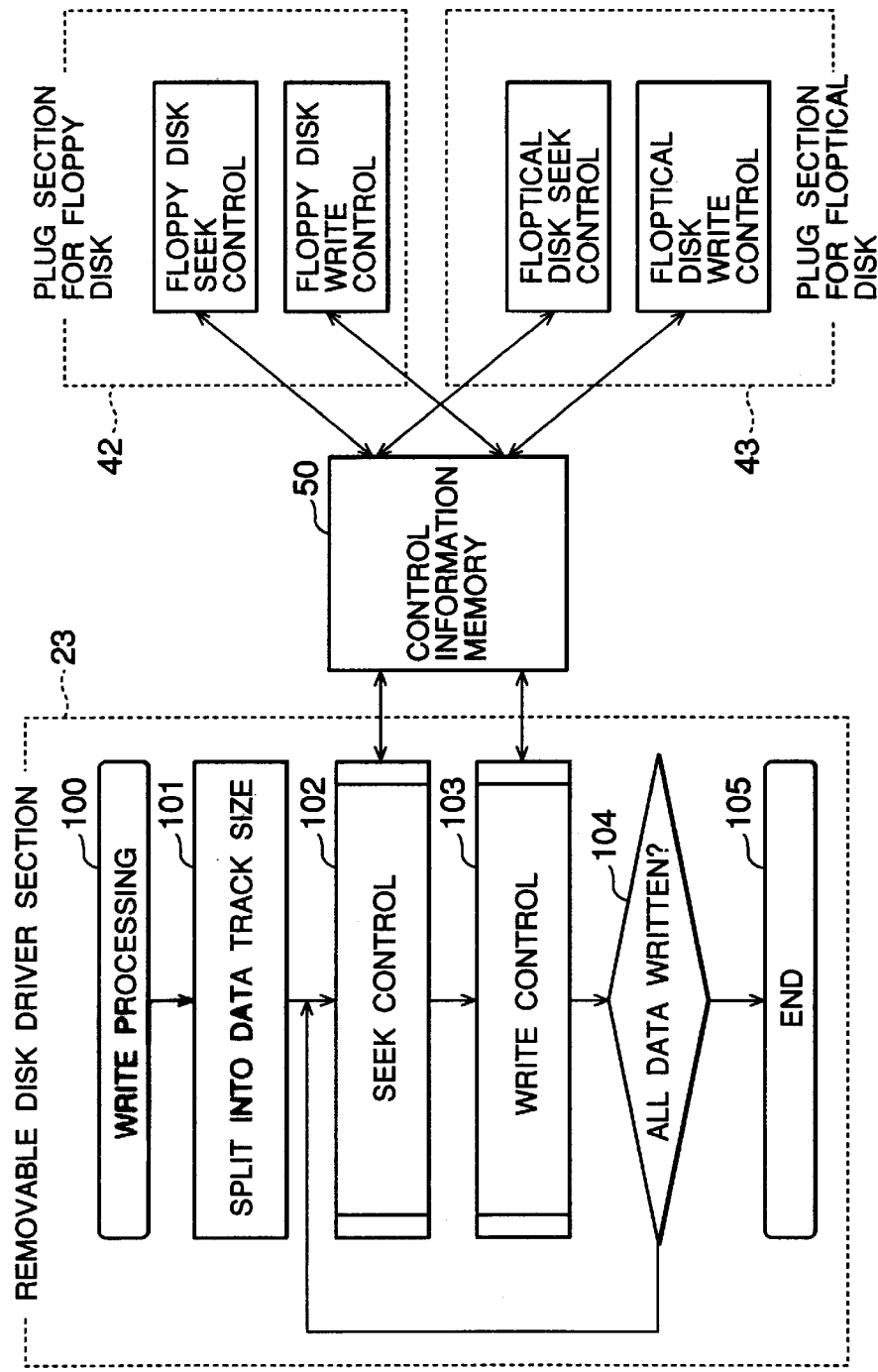
FIG. 6 is a flow chart showing the operation of the preferred embodiment of the invention in the example illustrated in FIG. 4.

FIG. 6 is a flow chart showing the flow of processing in a write operation.

Referring to FIG. 6, when a write request is issued from the user program section (10), write processing (100) by a removable disk driver section (23) is called. Since the control over data writing into a magnetic disk medium requires track-by-track write control and repeated seek control of the write head, the removable disk driver section (23) splits the write data delivered from the user program section (10) to fit the track size of the disk (101), and performs seek control (102) to search for the track points and sector positions of removable disks (32 and 33) and write control (103) to write data into those sector positions at those track points over all the split data (104).

Here, the seek control (102) can call the responsible one of the plug sections (42 and 43) for each control via a table in the control information memory (50) without being conscious of whether the user-specified hardware unit is the floppy disk apparatus (32) or the floptical disk apparatus. The same applies to the write control (103) as well. The removable disk driver section (23) converts the data specified by the user program (10) into a data form usable by the pertinent hardware unit, while the control information memory (50) replaces, on the basis of the table, the type of hardware and its operation specified by the user program section (10), specifies the control program section to control the operation of that hardware unit, and transfers the information to each plug section (42 or 43).

Another preferred embodiment of the invention is provided with a computer-readable medium in which the device driver control program in the above-described embodiment is recorded. This computer-readable medium may be a magnetic disk, a semiconductor memory or some other suitable medium. The device driver control program operates similarly to the device driver control described with reference to the foregoing embodiment.

This embodiment is provided with a control information memory for determining, upon receiving information on the type of hardware and an operating instruction directed to that hardware, which plug section should be given the operating instruction, and its common device driver section performs data converting calculation and calls the plug section via the control information memory, the plug sections, one provided for each hardware unit, controlling the corresponding hardware units. The common device driver section needs no more than one common program, while control of hardware units differing in control method is made possible by registering each plug with the control information memory and making ready the respective plug sections, thereby enabling the quantity of the use of resources including memories and disks to be reduced.

Thus, according to the present invention, even where there are a plurality of hardware units differing in control method, the only indispensable items on the main memory of the host computer are a program for data conversion and plug sections to control the hardware units currently in use. This enables the main memory to be effectively utilized for other purposes as well.

Furthermore, if an additional hardware unit differing in control method from existing units is to be connected to a computer system, only a plug section will need to be newly developed. Therefore, if the new unit requires no different method for data conversion from the existing hardware units, no new common device driver section will have to be developed, and accordingly the addition of hardware units is facilitated and so is system development.

Although the invention has been described in detail above with reference to various preferred embodiments thereof, it will be appreciated by those skilled in the art that these embodiments have been provided solely for the purpose of illustration, and are in no way to be regarded as limiting the invention. Instead various modifications and substitutions of equivalent techniques till be readily apparent to those skilled in the art upon reading this specification, and such modifications and substitutions are to be regarded as falling within the true scope and spirit of the following claims.

What is claimed is:

1. A device driver system for controlling operations of a plurality of hardware units connected to a computer system and differing in control methods, comprising:

a plurality of plug sections, provided as many as control methods for said plurality of hardware units, each of said control methods controlling operation of a corresponding hardware unit by a method appropriate thereto; and a controller which determines one of said plug sections to which an operating instruction is to be transferred, said controller determining said one of said plug sections based on information in the operating instruction identifying one of said plurality of hardware units and an operation to be performed by said one of said plurality of hardware units, said controller transferring the operating instruction to said one of said plug sections for execution by said one of said plurality of hardware units.

2. The device driver of claim 1, further comprising:

a single device driver which converts data into forms readable by any of said plurality of hardware units, said single device driver converting the operating instruction into a form readable by said one of said plurality of hardware units.

3. The device driver of claim 2, wherein said single device driver converts the operating instruction into said form before the operating instruction is input into said controller.

4. The device driver of claim 2, wherein said operating instruction derives from at least one of an operating program and an applications program of said computer system.

5. The device driver of claim 4, wherein said single device driver converts data from any of said plurality of hardware units into a form readable by at least one of said operating system and applications program of said computer system.

6. The device driver of claim 2, wherein said controller has a memory which stores a table defining a relationship between said one of said plug sections and information in the operating instruction identifying one of said plurality of hardware units and said operation to be performed by said one of said plurality of hardware units, said one of said plug sections determined with reference to the information in said table.

7. The device driver of claim 1, wherein said control programs are stored outside of said computer system in devices connected to respective ones of said plurality of hardware units.

8. A device driver system for controlling operations of a plurality of hardware units connected to a computer system and having a common understandable data form for operating instructions but differing in control method, comprising:

a plurality of plug sections, providing as many as control methods for said plurality of hardware units, each of said control methods controlling operation of a corresponding hardware unit by a method appropriate thereto;

a single device driver for all of said plurality of hardware units, said single device driver converting data into a plurality of forms readable by respective ones of said plurality of hardware units, said single device driver converting a data form of an operating instruction for one of said plurality of hardware units into another form understandable by said one of said plurality of hardware units; and a controller which determines, on a basis of information contained in the operating instruction whose data form has been converted by said single device driver, one of said plug sections to which the operating instruction is to be transferred, and which transfers the operating instruction to said one of said plug sections.

9. A device driver control method for controlling operations of a plurality of hardware units connected to a computer system and differing in control method, comprising the following steps of:

determining one of a plurality of plug sections to which an operating instruction is to be transferred, said plurality of plug sections numbering as many as control methods for said plurality of hardware units, with each of said control methods controlling operation of a corresponding hardware unit by a method appropriate thereto, said one of a plurality of plug sections being determined based on information in the operating instruction identifying one of said plurality of hardware units and an operation to be performed by said one of said plurality of hardware units; and transferring the operating instruction to said one of a plurality of plug sections.

10. A device driver control method for controlling operations of a plurality of hardware units connected to a computer system and having a common understandable data form for operating instructions but differing in control method, comprising the following steps of:

converting a data form for an operating instruction for one of said plurality of hardware units into another form understandable by that hardware unit using a single device driver supplied for performing data conversions for all of said plurality of hardware units;

determining, on a basis of information contained in the operating instruction whose data form has undergone said conversion to specify that hardware unit, one of a plurality of plug sections to which the operating instruction is to be transferred, said plurality of plug sections numbering as many as control methods for said plurality of hardware units, with each of said control methods controlling operation of a corresponding hardware unit by a method appropriate thereto; and transferring the operating instruction to said one of said plurality of plug sections.

11. The method of claim 10, further comprising:

adding a plug section to said plurality of plug sections when a new hardware unit having a control method unlike control methods for said plurality of hardware units is connected to said computer system, said addition of said new hardware unit being performed without adding a new device driver to said computer system.

12. A computer-readable medium provided on a computer-readable data storage device comprising:

a control program for a device driver in a computer system to which a plurality of hardware units differing in control method are connected, said program comprising:

a program portion which causes a computer to determine, on a basis of information contained in an operating instruction for one of said plurality of hardware units specifying that hardware unit, one of a plurality of plug sections to which the operating instruction is to be transferred, said information identifying one of said plurality of hardware units and an operation to be performed by said one of said plurality of hardware units, said plurality of plug sections numbering as many as control methods for said plurality of hardware units, with each controlling operation of a corresponding hardware unit by a method appropriate thereto, and wherein said program portion causes the operating instruction to be transferred to said one of a plurality of plug sections.

13. A computer-readable medium provided on a computer-readable data storage device, comprising:

a control program for a device driver in a computer system to which a plurality of hardware units having a common understandable data form for operating instructions but differing in control method are connected, said program comprising:

a first program portion having a single device driver program for all of said plurality of hardware units, said single device driver causing a computer to convert data into a plurality of forms understandable by respective ones of said plurality of hardware units, said single device driver program converting the data form for an operating instruction for one of said plurality of hardware units into another form understandable by that hardware unit; and a second program portions which causes the computer to determine, on a basis of information contained in the operating instruction whose data has undergone said conversion to specific that hardware unit, one of a plurality of plug sections to which the operating instruction is to be transferred, said plurality of plug sections numbering as many as control methods for said plurality of hardware units, with each controlling operation of a corresponding hardware unit by a method appropriate thereto, and wherein said second program portion transfers the operating instruction to said one of said plurality of plug sections.

* * * * *